United States Patent
Nuñez Isaza

(10) Patent No.: US 8,993,817 B2
(45) Date of Patent: Mar. 31, 2015

(54) PROCESS TO OBTAIN DIESEL FROM VEGETABLE AND ANIMAL OILS THROUGH A HYDROTREATMENT WITH SHORT RESIDENCE TIME AND BYPRODUCTS OBTAINED FROM IT

(76) Inventor: Manuel Laureano Nuñez Isaza, Santander (CO)

( * ) Notice: Subject to any disclaimer, the term of this patent is extended or adjusted under 35 U.S.C. 154(b) by 1225 days.

(21) Appl. No.: 12/745,380

(22) PCT Filed: Nov. 7, 2008

(86) PCT No.: PCT/IB2008/003273
§ 371 (c)(1),
(2), (4) Date: Nov. 1, 2010

(87) PCT Pub. No.: WO2009/068981
PCT Pub. Date: Jun. 4, 2009

(65) Prior Publication Data
US 2011/0035989 A1    Feb. 17, 2011

(30) Foreign Application Priority Data
Nov. 29, 2007  (CO) ........................... 126779

(51) Int. Cl.
*C07C 1/00* (2006.01)
*C10G 3/00* (2006.01)
*C10G 45/08* (2006.01)

(52) U.S. Cl.
CPC *C10G 45/08* (2013.01); *C10G 3/46* (2013.01); *C10G 3/50* (2013.01); *Y02E 50/13* (2013.01);
(Continued)

(58) Field of Classification Search
CPC ............... C10G 45/00; C10G 65/00; C10G 2300/1011; C10G 2300/1018; C10G 2300/1055; C10G 2300/1037; C10G 3/46

USPC ............................ 585/240, 242; 44/605, 606
See application file for complete search history.

(56) References Cited

U.S. PATENT DOCUMENTS

| 4,992,605 A | 2/1991 | Craig et al. |
| 5,705,722 A | 1/1998 | Monnier et al. |

(Continued)

FOREIGN PATENT DOCUMENTS

| EP | 1 693 432 | 8/2006 |
| EP | 1 728 844 | 12/2006 |

(Continued)

OTHER PUBLICATIONS

Alencar et al. "Pryolysis of Tropical Vegetable Oils." *J. Agric. Food. Chem.* vol. 31. 1983. pp. 1270-1275.
(Continued)

*Primary Examiner* — Nina Bhat
(74) *Attorney, Agent, or Firm* — Merchant & Gould P.C.

(57) ABSTRACT

A method for obtaining diesel fuel from vegetable or animal oils through the addition of hydrogen in the presence of catalysts under suitable temperature and pressure conditions is described. The method is different from other similar methods in that it involves the use of space velocities of between 5.1 h-1 and 9 h-1, thereby enabling a reduction in the size of the reactor and in hydrogen consumption, as well as lowering construction and operating costs. The invention also relates to the products obtained using said method, which have demonstrated that in additions, even below 10%, they improve the performance of diesel engines, thereby lowering fuel consumption.

11 Claims, 3 Drawing Sheets

(52) U.S. Cl.
CPC *C10G 2300/1037* (2013.01); *C10G 2300/4018* (2013.01); *C10G 2300/1014* (2013.01); *C10G 2300/1018* (2013.01); *C10G 2400/04* (2013.01); *B01J 2219/00006* (2013.01)
USPC ................ 585/240; 585/242; 44/605; 44/606

(56) References Cited

U.S. PATENT DOCUMENTS

| | | | |
|---|---|---|---|
| 7,232,935 B2* | 6/2007 | Jakkula et al. | 585/240 |
| 7,491,858 B2* | 2/2009 | Murzin et al. | 585/240 |
| 7,550,643 B2* | 6/2009 | Pfefferle | 585/720 |
| 7,754,931 B2* | 7/2010 | Monnier et al. | 585/240 |
| 8,026,401 B2* | 9/2011 | Abhari et al. | 585/240 |
| 8,067,657 B2* | 11/2011 | Duarte Santiago et al. | 585/733 |
| 8,119,847 B2* | 2/2012 | Dindi et al. | 585/240 |
| 8,142,527 B2* | 3/2012 | Herskowitz et al. | 44/605 |
| 2006/0186020 A1* | 8/2006 | Gomes | 208/46 |
| 2006/0207166 A1* | 9/2006 | Herskowitz et al. | 44/385 |
| 2006/0264684 A1* | 11/2006 | Petri et al. | 585/250 |
| 2007/0006523 A1 | 1/2007 | Myllyoja et al. | |
| 2007/0131579 A1* | 6/2007 | Koivusalmi et al. | 208/19 |
| 2008/0161614 A1 | 7/2008 | Bertoncini et al. | |
| 2008/0244962 A1* | 10/2008 | Abhari et al. | 44/308 |
| 2009/0166256 A1* | 7/2009 | Lewis et al. | 208/89 |

FOREIGN PATENT DOCUMENTS

| | | |
|---|---|---|
| WO | WO 2006/100584 | 9/2006 |
| WO | WO 2007/003709 | 1/2007 |
| WO | WO 2007/125332 | 11/2007 |
| WO | WO 2008/084145 | 7/2008 |

OTHER PUBLICATIONS

International Search Report from International application No. PCT/IB2008/003273 dated Feb. 25, 2009 (Form PCT/ISA/210).

\* cited by examiner

PROCESS TO OBTAIN DIESEL FROM VEGETABLE AND ANIMAL OILS THROUGH A HYDROTREATMENT WITH SHORT RESIDENCE TIME AND BYPRODUCTS OBTAINED FROM IT

This application is a National Stage Application of PCT/IB2008/003273, filed 7 Nov. 2008, which claims benefit of Serial No. 07-126779, filed 29 Nov. 2007 in Colombia and which applications are incorporated herein by reference. To the extent appropriate, a claim of priority is made to each of the above disclosed applications.

TECHNOLOGICAL SECTOR

The present invention explains a process consisting of the production of diesel fuel from vegetable or animal oils with the addition of hydrogen in the presence of catalysts at proper temperature and pressure conditions. This process differs from others in that the residence times are shorter which allows reducing the size of the reactor and the consumption of hydrogen, thus decreasing the equipment construction and the operation costs. Likewise, the byproducts obtained from this process are also part of this invention.

STATE OF THE ART

Nowadays, there is a trend focused on the use of alternative fuels for transportation, considering that the traditional source to obtain these fuels is petroleum, a non renewable resource that is gradually running out.

With the intention to set new options for the production of fuels, it has been proposed the production of diesel fuel from vegetable oils, which can be hydrogenated to produce paraffin rated within the diesel distillation range.

Alencar and et al, J. Agricultural Food Chemistry, Volume 31, No 6, 1268 to 1270, 1983, have shown that several fuels and industrial chemicals can be obtained from vegetable oils by simply changing the nature of the catalyst and the cracking process' temperature. Consequently, if calcium oxide is used as a catalyst, the product will consist of long-chain methyl ketones. On the other hand, if the catalyst is bentonite the main resulting product would be alquilbenzene.

In view of the above, there is a Canadian patent related with the production of a high performance diesel fuel obtained by hydrotreatment and from pure vegetable oils (U.S. Pat. No. 4,992,605). The process shows that the vegetable oils are put into contact with gaseous hydrogen at temperatures between 350° C. to 450° C. (662° F. to 842° F.) in the presence of a catalyst including cobalt-molybdenum or nickel-molybdenum, allowing the production of diesel which is separated from the mixture of the byproducts. This process is performed at space velocities of 0.5 $h^{-1}$ to 5 $h^{-1}$, where the space velocity is inverse to the reaction time, this is, the time during which the load is in contact with hydrogen and the catalyst and is expressed as the Liquid Hour Space Velocity (LHSV.)

Petrobras has filed patent application US 2006/0186020 for a process derived from the patent mentioned above which refers to the production of diesel obtained by hydrotreatment and from a mixture of vegetable oils and hydrocarbons. This process reports space velocities between 0.5 $h^{-1}$ and 2 $h^{-1}$.

In view of the above, application EP 1728844 was filed showing a procedure including the pre-treatment of the load to remove pollutants such as alkali metals, which may deactivate the catalyst. Again, space velocities within a range of 1 $h^{-1}$ to 4 $h^{-1}$ were mentioned.

Other types of oils used in these processes are reported in U.S. Pat. No. 5,705,722 which refers to a process to produce additives for diesel fuel with a high amount of ketanes that improve diesel properties. In said process, space velocities are between 0.5 $h^{-1}$ and 5 $h^{-1}$.

Other alternative to the process is reported in applications US 2007/0006523, U.S. Pat. No. 7,232,935 and WO2007/003709, where the linear paraffin obtained during the hydrotreatment of the vegetable oils are converted, using catalysts, into paraffin with linear chains by isomerization, thus improving the low temperature performance of the fuels obtained by hydrotreatment.

Application WO2006/100584 also pretends to solve the diesel stream problem at low temperatures and proposes hydrotreatment and isomerization of the vegetable oils in one single reactor. Space velocities handled in this process range between 0.5 $h^{-1}$ and 5 $h^{-1}$.

As it may be observed, the hydrotreatment processes mentioned before are performed at space velocities ranging between 0.5 $h^{-1}$ and 5 $h^{-1}$, which are the normal LHSV used in the oil industry. The applicant has surprisingly found that being the vegetable and animal oils from a source different to the hydrocarbons, they show a different reactivity that permits exploring other space velocity ranges, which is the main concern of the present invention.

Consequently, there is a need for new processes in the state of art to reduce the residence time and allow the reduction of the reactors sizes while the consumption of hydrogen per liter of oil decreases and the production of high-performance products is assured, when they are used as components for diesel engines fuels.

DESCRIPTION OF THE INVENTION

The process herein claimed exceeds the existing outcome of the state of the art. For instance, a reactor capable of processing 2,000 liters per day using the current technology of the state of the art could process 12,000 to 15,000 liters per day of pure vegetable or animal oil using the technology proposed in the present invention, reducing up to a 40% the consumption of hydrogen with respect to the amount required by the other technologies In general, the process claimed comprises the heating, reaction, decantation separation and, a prior discretional stage of mixing oils and hydrocarbons and/or a distillation separation stage, as it is shown in FIG. 1. The sequence of steps featured with the invention is explained as it follows:

1. Heat up the vegetable or animal oil in a furnace at the reaction temperature of 280° C. to 450° C. (536° F. to 842° F.) depending on the quality of the catalyst and the composition of the load. The exact temperature for this part of the process is determined empirically for a given system, increasing the temperature of the load until the desired quality of the product is achieved.
2. Pass the oil from stage one through a reactor filled with a catalyst composed of a porous solid material with deposits of active metallic sulphurs on its surface. There, the hydrotreatment reaction happens at a temperature between 280° C. and 450° C. (536° F. to 842° F.) a pressure between 5.0 MPa and 15 MPa, space velocity between 5.1 $h^{-1}$ and 9.0 $h^{-1}$, and a relation of hydrogen per load between 178 L of $H_2$ per liter of oil and 534.3 L of $H_2$ per liter of oil, which surprisingly allow the reactions transforming oil into the desired products on the range of diesel to be performed, with a shorter residence time and a reduction in the consumption of hydrogen of as much as a 40%.
3. Recover the product from the previous stage in closed containers and separate them by decantation into three phases: water, oil, and gases. These streams are physically separated by means of well-known and widely used techniques in the industry. The gases obtained can be used as fuel in the refinery or can be separated and purified to recover the hydrogen, which is recirculated.

BRIEF DESCRIPTION OF THE DRAWINGS

FIG. 1 shows the streamchart of the process; where upon the diesel (1) and oil (2) storage stream (3) is pumped having the desired composition. The mixture obtained is then combined with hydrogen (8) and passes through a heating (4) and subsequent reaction process (5) where the products are transformed and then separated in stages (6 and 9). The hydrogen stream can recirculated after being purified (7) and compressed (8). The separation (6) produces diesel (A) and water (B).

In an embodiment of the invention, the vegetable or animal oil can be used as raw material in a 100% pure stream or in mixtures with hydrocarbons coming from petroleum ranging between 0 and 99% in volume. In this last case, the process comprises a previous additional stage before the heating process, which consist on mixing both the vegetable oil stream and the hydrocarbons stream, which is to be done in line at a temperature such to make the vegetable oil acquire the necessary fluidity to mix with the hydrocarbon load.

Other embodiment of the invention includes a distillation separation stage at the end of the process, performed by means of the traditional procedures, to separate the streams depending on the boiling point. It is preferred to include this stage in separation processes with space velocities above 7.5 $h^{-1}$.

In extreme cases, at space velocities near to 9 $h^{-1}$, a bottoms material that did not react can be obtained; such material is recovered by distillation and is recirculated to start the process from stage 1. In any case, recirculating does not eliminate the benefit of hydrotreating a larger load volume per reactor volume.

Now, in a preferred embodiment the second stage catalyst comprises a porous alumina support impregnated with metallic Ni and Mo or of Ni and Co sulphurs.

The great advantage of this invention is that the hydrotreatment process of the vegetable oils under these conditions allows having short reaction times, which make it possible to work with smaller reactors than those traditionally used for specific loads, when compared to the reactors required for the existing processes. This affects directly the building costs of these plants which, by operating at high pressures, require specialized materials and production techniques increasing the prices considerably depending on the size of the reactor.

Moreover, the hydrogen consumption is optimized due to shorter reaction times than those reported for conventional processes, as the development of undesired reactions in the production of diesel fuel that consume hydrogen—the most expensive raw material of the process—is controlled.

Figure 1:
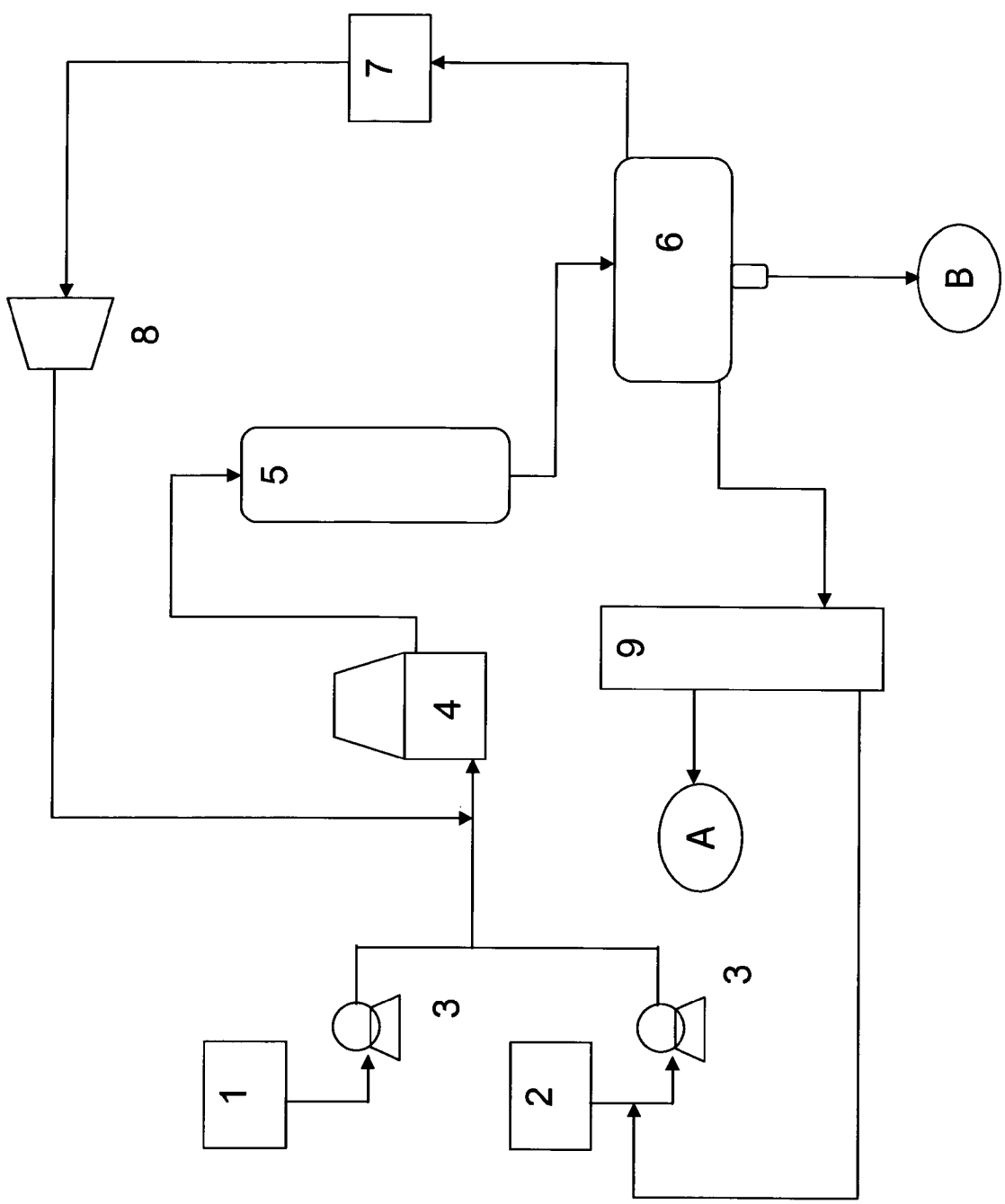
FIG. 1 shows the stream chart process of producing diesel from vegetable and animal oils.
Figure 2:
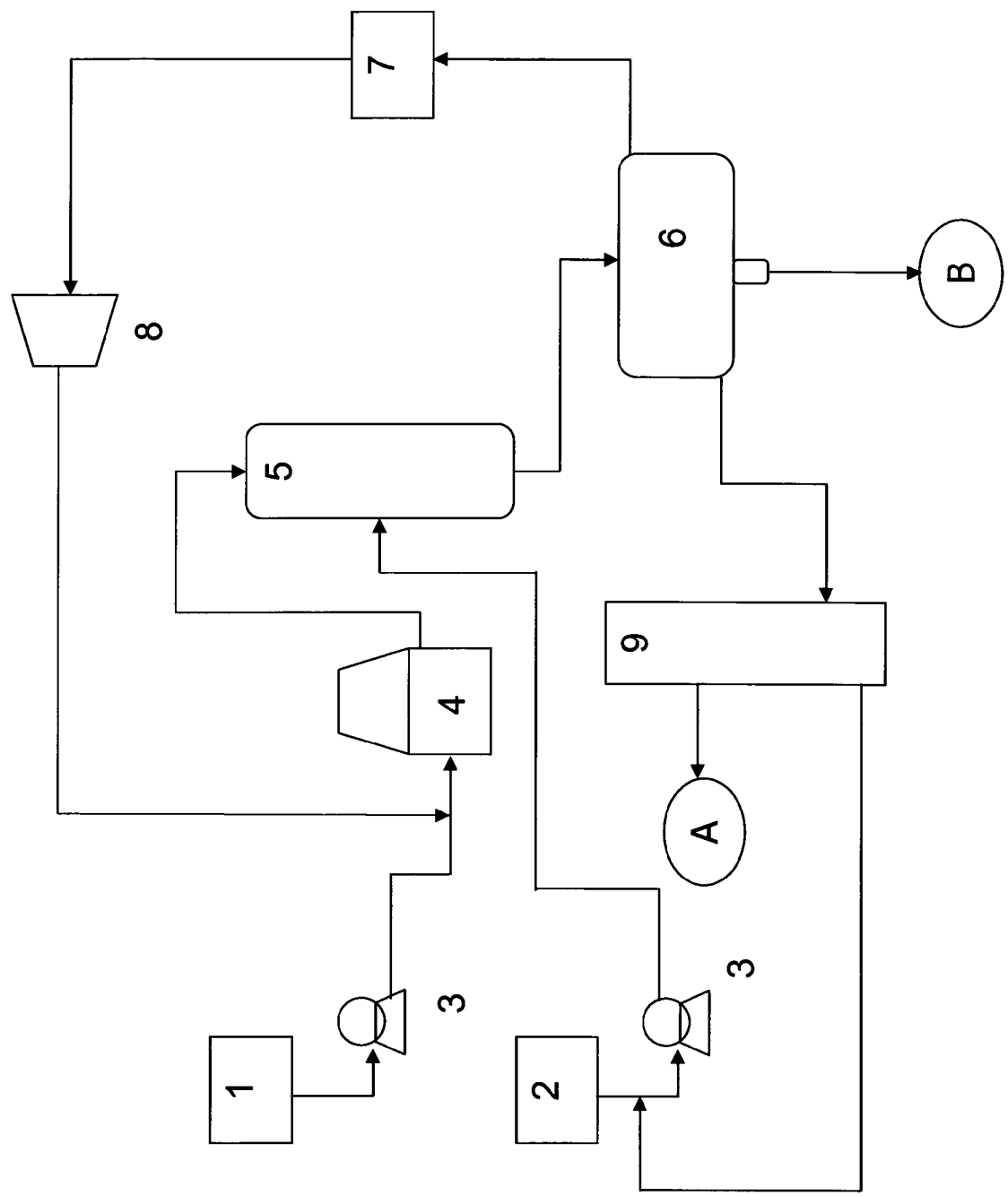
FIG. 2 shows the stream chart process of producing diesel wherein the vegetable oil is added at an intermediate part of the catalyst bed.

The reduced residence times in the reactor allow the vegetable oil stream to be added at an intermediate part of the catalytic bed, as it is shown on FIG. 2, allowing the catalyst upstream to be protected from the gasses generated by the reactions of the vegetable and animal oils, such as CO and $CO_2$, which contaminate the catalyst. Therefore, a variation embodiment of the invention comprises the addition of vegetable oil directly into an intermediate part of the reactor or between reactors when the process is performed using several reactors in series.

Figure 3:
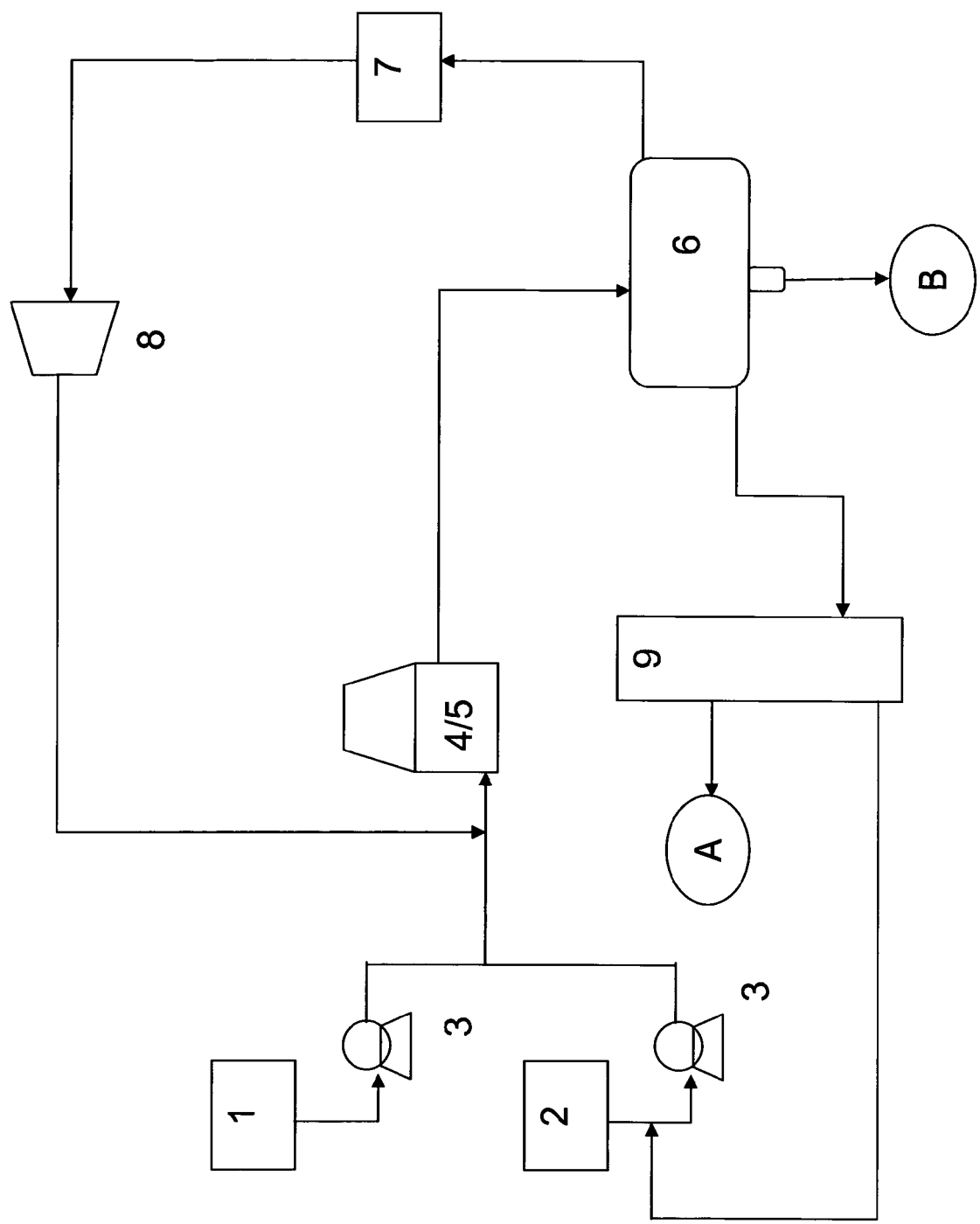
FIG. 3 shoes the tubular reactors integrated with the furnace.

Similarly, the low residence times also originates another embodiment of the invention in which the reaction stage (5) is performed in the tubular reactors, which in some cases may be integrated to the furnace (4) in such a way that the tube inside the furnace is filled with the catalyst (4/5) eliminating the need of a separate equipment to perform the reactor's function, as it is shown in FIG. 3.

Furthermore, is a part of the invention claimed herein the products obtained from the process defined above, which have shown that in additions, even under 10%, they improve the performance of Diesel engines, especially reducing the consumption of fuel.

Next, we show some examples of the best way to carry out the invention. These examples are illustrative and by no means pretend to limit the scope of the invention.

EXAMPLES

Tests were performed at the pilot plant with pure palm oil, at space velocities between 6.6 $h^{-1}$ and 8.0 $h^{-1}$, using a conventional catalyst for hydrotreatment of paraffins, in order to obtain a main product within the distillation range of Diesel.

The pilot plant test conditions are shown on Table 1.

TABLE 1

Operation conditions for the tests performed at the pilot plant.

| Space Velocity $h^{-1}$ | Temperature (° C.) | Pressure (MPa) | $H_2$ LN/ load oil L | Consumption of $H_2$ LN/oil L |
|---|---|---|---|---|
| 2 | 350 | 9 | 471 | 354 |
| 6.6 | 413 | 9 | 277 | 258 |
| 8 | 400 | 9 | 208 | 195 |

The run performed at a space velocity of 2 $h^{-1}$ was done as a reference to compare it with the known processes. It can be seen that insofar as it is performed at higher space velocities and a lower relation between hydrogen and load streams, the consumption of hydrogen decreases favoring the fuel production costs.

Table 2 shows a comparison of the characteristics of the fuels obtained through hydrotreatment of the palm oil at different space velocities, and are compared to those of a diesel extra (DE).

TABLE 2

Properties of Diesel and of the vegetable oil hydrotreated at different LHSV.

| Properties | Units | DE | Hydrotreated crude oil (CO) LHSV: 2 $h^{-1}$ | Hydrotreated crude oil (CO) LHSV: 6 $h^{-1}$ | Hydrotreated crude oil (CO) LHSV: 8 $h^{-1}$ |
|---|---|---|---|---|---|
| Cetane number | Ketanes | 50.3 | 95.7 | 98.1 | 92.0 |
| Density | g/ml | 0.847 | 0.785 | 0.782 | 0.7896 |
| Flash point | ° C. | 66 | 96 | 20 | 13 |
| Cloud point | ° C. | −2 | 26 | 20 | 22 |

TABLE 2-continued

Properties of Diesel and of the vegetable oil hydrotreated at different LHSV.

| Properties | Units | DE | Hydrotreated crude oil (CO) LHSV: 2 h$^{-1}$ | Hydrotreated crude oil (CO) LHSV: 6 h$^{-1}$ | Hydrotreated crude oil (CO) LHSV: 8 h$^{-1}$ |
|---|---|---|---|---|---|
| Fluidity point | ° C. | −6 | 18 | 15 | 18 |
| Heat of Combustion | MJ/Kg | 45.764 | 46.889 | 46.966 | 46.492 |
| Ashes | % p | <0.001 | 0.013 | <0.001 | <0.001 |
| Acidity | mgKOH/g | | 0.001 | <0.10 | 7.105 |
| Corrosion of Cu | | 1A | 1A | 1A | 1A |

It is notorious the difference in the Cetane number, which are highly superior for the fuels obtained by hydrotreatment of palm oil; even when this is obtained at very high space velocities, which make these products very attractive to be part of a commercial fuel. For high space velocities it can be seen an increase in the cloud point, fluidity point, and acidity, as well as a reduction of the flash point under the same conditions. These properties can be adjusted through dilution with appropriate streams such as diesel obtained from petroleum.

Table 3 shows the characterization of mixtures at different proportions of high quality Diesel with fuels obtained from palm oil at high space velocities. The characteristics of the mixtures are similar to those of the high quality diesel.

TABLE 3

Properties of hydrotreated diesel-oil mixtures at different space velocities and different proportions.

| Test | DE | Mx 3% CO-DE LHSV: 6 h$^{-1}$ | Mx 5% CO-DE LHSV: 6 h$^{-1}$ | Mx 10% CO-DE LHSV: 6 h$^{-1}$ | Mx 3% CO-DE LHSV: 8 h$^{-1}$ | Mx 5% CO-DE LHSV: 8 h$^{-1}$ | Mx 10% CO-DE LHSV: 8 h$^{-1}$ |
|---|---|---|---|---|---|---|---|
| Cetane number | 50.3 | 50 | 51 | 52.6 | 50.1 | 50.4 | 51.9 |
| Density (g/ml) | 0.8477 | 0.833 | 0.8316 | 0.8293 | 0.8331 | 0.8324 | 0.8309 |
| Flash point (° C.) | 66 | 60 | 61 | 59 | 61 | 61 | 60 |
| Cloud point (° C.) | −2 | −2 | −1 | −1 | −1 | −2 | −2 |
| Fluidity point (° C.) | −6 | −12 | −12 | −12 | −12 | −12 | −12 |
| Heat of combustion (MJ/Kg) | 45.764 | 45.655 | 45.321 | 45.659 | 45.647 | 45.697 | 45.610 |
| Corrosion of Cu | 1A | 1A | 1A | 1A | 1A | 1A | 1A |

It is observed that all the characteristics of the mixtures are similar to those of the diesel (DE) obtained from petroleum.

Test in Engines of the Hydrotreated Diesel-Palm Oil Mixtures Obtained at High Space Velocities To learn the behavior of the fuel obtained and of the combinations with high quality Diesel (DE), tests were performed on an experimental Cummins 160, model 1998, Diesel engine, in compliance with standard SAE J1349.

The results obtained are shown on table 4. Results of the tests with high quality Diesel (DE) and methyl ester (biodiesel) are also illustrated on this table. This fuel is produced by the transesterification of vegetable oils.

TABLE 4

Power, torque, and fuel consumption of a diesel cycle engine with different fuels and mixtures.

| | DE | ME | 30%/ 2 h$^{-1}$ | 20%/ 2 h$^{-1}$ | 10%/ 6 h$^{-1}$ | 5%/ 6 h$^{-1}$ | 3%/ 6 h$^{-1}$ | 10%/ 8 h$^{-1}$ | 5%/ 8 h$^{-1}$ | 3%/ 8 h$^{-1}$ |
|---|---|---|---|---|---|---|---|---|---|---|
| Maximum Torque (NM) | 543.9 | 540.1 | 554.2 | 558.0 | 557.2 | 546.8 | 557.5 | 555.3 | 556.2 | 563.9 |

TABLE 4-continued

Power, torque, and fuel consumption of a diesel cycle engine with different fuels and mixtures.

| | DE | ME | 30%/ 2 h⁻¹ | 20%/ 2 h⁻¹ | 10%/ 6 h⁻¹ | 5%/ 6 h⁻¹ | 3%/ 6 h⁻¹ | 10%/ 8 h⁻¹ | 5%/ 8 h⁻¹ | 3%/ 8 h⁻¹ |
|---|---|---|---|---|---|---|---|---|---|---|
| Maximum Power (KW) | 120.3 | 121.3 | 124.8 | 124.7 | 124.0 | 124.2 | 125.5 | 123.9 | 126.7 | 127.2 |
| Fuel Consumption (g/kwh) | 254.7 | 267.1 | 241.8 | 248.5 | 235.0 | 233.2 | 231.4 | 236.0 | 231.3 | 230.0 |

20%/2 h⁻¹: Mixture of 20% vegetable crude oil hydrotreated at LHSV: 2 h⁻¹, and 80% Diesel
30%/2 h⁻¹: Mixture of 30% vegetable crude oil hydrotreated at LHSV: 2 h⁻¹, and 70% Diesel
10%/6 h⁻¹: Mixture of 10% vegetable crude oil hydrotreated at LHSV: 6 h⁻¹, and 90% Diesel
3%/6 h⁻¹: Mixture of 3% vegetable crude oil hydrotreated at LHSV: 6 h⁻¹, and 97% Diesel
10%/8 h⁻¹: Mixture of 10% vegetable crude oil hydrotreated at LHSV: 8 h⁻¹, and 90% Diesel
5%/8 h⁻¹: Mixture of 5% vegetable crude oil hydrotreated at LHSV: 8 h⁻¹, and 95% Diesel
3%/8 h⁻¹: Mixture of 3% vegetable crude oil hydrotreated at LHSV: 8 h⁻¹, and 97% Diesel Table 4 demonstrates that the tests performed with mixtures of fuels obtained from mixing diesel and palm oil hydrotreated at high space velocities offer less fuel consumption, even at low additions of oil hydrotreated at high space velocities.

The invention claimed is:

1. A process to produce diesel from vegetable or animal oils by a hydrotreatment process comprising the following steps:
   a. combining hydrogen with pure vegetable or animal oil or with a combination of hydrocarbons and vegetable oil or animal oil to produce a mixture;
   b. heating up the mixture of step a in a furnace at a reaction temperature between 280° C. and 450° C. (536° F. to 842° F.);
   c. passing the mixture from step b through a reactor filled with a catalyst composed of a porous solid material containing active metallic sulphurs deposited on its surface to effect a hydrotreatment reaction at a temperature between 280° C. and 450° C. (536° F. to 842° F.), pressure between 5.0 MPa and 15 MPa, space velocity between 5.1 h⁻¹ and 9.0 h⁻¹, and a ratio of hydrogen per oil load between 178 NL of $H_2$ per liter of oil and 534.3 NL of $H_2$ per liter of oil; and
   d. recovering the product from the previous step in closed containers and separating it by decantation into 3 phases: water, oil, and gasses.

2. The process of claim 1, in which the combination of hydrocarbons and vegetable oil or animal oil comprises up to 99% of hydrocarbons in volume.

3. The process of claim 2, wherein step a comprises combining the vegetable oil or animal oil and the hydrocarbons in line at the temperature at which the vegetable oil or animal oil acquires an appropriate fluidity to mix itself with the hydrocarbons.

4. The process of claim 1, wherein the process includes a distillation separation step at the end of the process.

5. The process of claim 1, wherein the process includes a distillation separation step at the end of the process when the space velocity is higher than 7.5 h⁻¹.

6. The process of claim 5, wherein material that does not react is recovered through distillation and is recirculated to step a.

7. The process of claim 1, wherein the gases obtained from the decantation in step d are recovered, purified, and recirculated.

8. The process of claim 1, wherein the catalyst comprises a porous alumina support impregnated with Ni and Mo or Ni and Co metallic sulphurs.

9. The process of claim 1, wherein the reactor comprises a catalytic bed comprising the catalyst, and wherein the vegetable oil or animal oil is added at an intermediate portion of the catalytic bed.

10. The process of claim 9, wherein the vegetable oil or animal oil is added at an intermediate part of the catalytic bed without prior warming.

11. The process of claim 1, wherein the reactor comprises tubular reactors integrated to the furnace and wherein the tubular reactors are filled up with catalyst.

* * * * *